(12) United States Patent
Trossen

(10) Patent No.: US 6,665,723 B2
(45) Date of Patent: Dec. 16, 2003

(54) EXTERNAL TRUSTED PARTY CALL PROCESSING IN SIP ENVIRONMENTS

(75) Inventor: Dirk Trossen, Arlington, MA (US)

(73) Assignee: Nokia Corporation, Espoo (FI)

( * ) Notice: Subject to any disclaimer, the term of this patent is extended or adjusted under 35 U.S.C. 154(b) by 119 days.

(21) Appl. No.: 09/995,568

(22) Filed: Nov. 29, 2001

(65) Prior Publication Data

US 2003/0101266 A1 May 29, 2003

(51) Int. Cl.[7] .............................................. G06F 15/16
(52) U.S. Cl. ....................... 709/227; 709/206; 709/228; 709/232
(58) Field of Search ................................. 709/227, 228, 709/243, 244, 206, 232; 379/242, 201.01

(56) References Cited

U.S. PATENT DOCUMENTS

| | | | |
|---|---|---|---|
| 5,898,917 A | * 4/1999 | Batni et al. ................... | 455/564 |
| 5,999,610 A | * 12/1999 | Lin et al. ................. | 379/207.02 |
| 6,243,453 B1 | * 6/2001 | Bunch et al. .......... | 379/201.01 |
| 6,292,550 B1 | * 9/2001 | Burritt .................... | 379/201.01 |
| 6,480,597 B1 | * 11/2002 | Kult et al. ................... | 379/242 |
| 6,522,734 B1 | * 2/2003 | Allen et al. ............. | 379/114.29 |
| 6,522,876 B1 | * 2/2003 | Weiland et al. .......... | 455/414.1 |
| 2001/0026548 A1 | 10/2001 | Strathmeyer et al. | |
| 2002/0085517 A1 | 7/2002 | Lee et al. | |
| 2002/0118675 A1 | * 8/2002 | Strathmeyer et al. ....... | 370/352 |
| 2002/0120691 A1 | * 8/2002 | Patil et al. ................... | 709/206 |
| 2002/0150226 A1 | * 10/2002 | Gallant et al. ......... | 379/210.02 |
| 2002/0160810 A1 | 10/2002 | Glitho et al. | |
| 2002/0169776 A1 | 11/2002 | Tuunanen et al. | |
| 2002/0172344 A1 | * 11/2002 | Kruger ........................ | 379/219 |
| 2002/0181683 A1 | * 12/2002 | Mani ...................... | 379/201.01 |

OTHER PUBLICATIONS

M. Handley et al., SIP: Session Initiation Protocol, RFC 2543, Mar. 1999.
J. Lennox et al., "CPL: A Language for User Control of Internet Telephony Services", Internet Draft, Work in Progress, Nov. 2000.
J. Lennox et al., "Call Processing Language Framework and Requirements", Request for Comments 2824, Internet Engineering Task Force, May 2000.

* cited by examiner

*Primary Examiner*—Nabil El-Hady
(74) *Attorney, Agent, or Firm*—Banner & Witcoff, Ltd.

(57) ABSTRACT

A method for outsourcing Internet call processing functions from a session initiation protocol (SIP)-compliant proxy to a third-party call processing entity comprises the steps of executing a call processing language script in the SIP-compliant proxy, detecting an external-switch, transferring call processing to the third-party identified in an external-switch parameter, detecting an external-result, decoding the external-result and completing the call processing using information in the external-result. Similarly, a system for outsourcing Internet call processing functions to a third-party call processing entity from a session initiation protocol (SIP)-compliant proxy is described, which comprises a device for executing a call processing language script in the SIP-compliant proxy using an interpreter, communication between the call processing language script and the interpreter and communication between the interpreter and the third-party call processing entity.

33 Claims, 2 Drawing Sheets

EXTERNAL TRUSTED PARTY CALL PROCESSING IN SIP ENVIRONMENTS

FIELD OF THE INVENTION

The present invention relates generally to an extension to a call processing language. The present invention relates more specifically to one or more extensions that enable external trusted party call processing in Session Initiation Protocol (SIP) environments.

BACKGROUD OF THE INVENTION

SIP is a standard protocol for initiating an interactive user session involving multimedia elements such as video, games, voice, virtual reality and the like. In addition to initiating multimedia sessions, SIP can establish and maintain Internet telephone calls. Internet telephony is becoming increasingly popular as a means to avoid the high cost of conventional wired-line telephone charges.

SIP-based environments are assumed to become the next generation service creation platform for the Internet. As a request-response protocol, SIP accepts requests from clients and delivers responses from servers with participants identified by URLs. SIP establishes call parameters at either end of the communication session and handles the call transfer and call termination.

Call processing languages are used to tailor and adapt call control services to users' preferences based on context information such as location, time, availability, or any other personal context information. One known call processing language is Call Processing Language (CPL), currently being standardized by the Internet Engineering Task Force (IETF) to enable call processing functionality. This known approach, however uses location and time information. Additionally, in the prior art the entire call processing logic has been assumed to be located in an SIP-compliant proxy.

CPL is specified in eXtended Mark-up Language (XML) and enables call signaling functionality like redirection or rejection based on call processing logic defined in the CPL standard. Thus, CPL is intended for call processing of incoming and outgoing Internet calls based on user-specific preferences. However, the context-specific language extensions to CPL and the possibility of executing context-specific functionality in an external trusted third-party call processing entity have not been previously defined. Additionally, there is currently no mechanism in CPL that can be used to access data stored in an external database.

SUMMARY OF THE INVENTION

CPL allows for extensions to the core language through the introduction of new language elements. This is easily accomplished because CPL is defined in XML. In the prior art there are no extensions defined to provide the functionality necessary to execute call processing on trusted third-party call processing entities. Outsourcing call processing functionality to a trusted third-party entity would be useful for several reasons. Unlike outsourcing, the execution of highly confidential context-specific logic in the central SIP proxy could be viewed as an obstacle to deployment due to privacy and security concerns. In addition, execution of logic that accesses highly confidential personal data, such as pulse rate, body temperature, etc. also raises privacy and security concerns. Finally, extending the core functionality of CPL by additional context-specific logic leads to increasing the complexity of CPL itself, which will further restrict its applicability due to execution in the central SIP-compliant proxy.

The present invention forwards call processing of SIP calls to external trusted party call processing entities for context-specific call processing. With this approach, context-aware call processing is enabled while preserving privacy by outsourcing context-aware call processing logic to external trusted parties instead of executing the process centrally at the SIP-compliant proxy. Additionally, context-specific call processing logic can be used without integrating the entire functionality into CPL, keeping the language less complex. Thus, an external trusted third-party call processing entity can provide any kind of call processing functionality and the present invention is not limited to the particular context-specific examples described herein.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
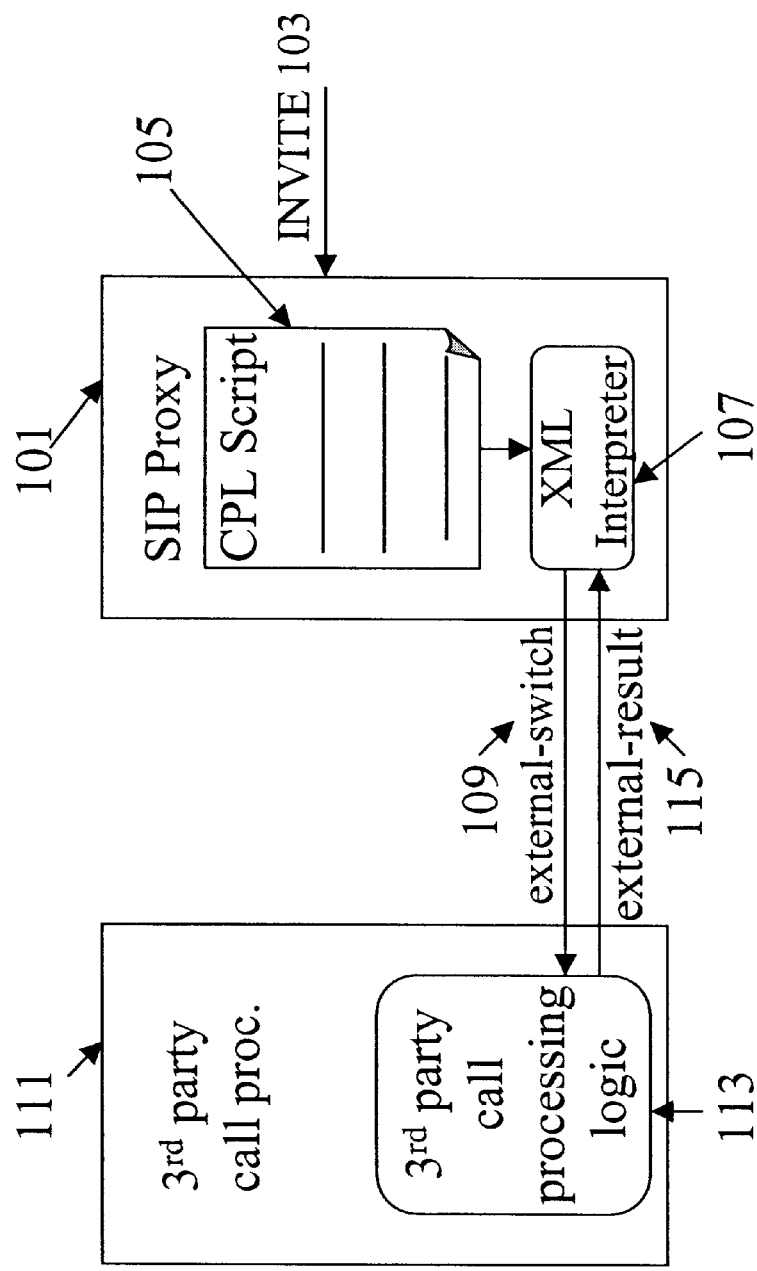
FIG. 1 shows the signaling communication between a SIP-compliant proxy and an external trusted third-party call processing entity.

In order to support the approach of the present invention, two language elements are added to a call processing language, such as Call Processing Language (CPL) to define the underlying communication between an SIP-compliant proxy and an external trusted third-party call processing entity. CPL is used in the exemplary embodiment described herein but is not intended to be limiting. The use of CPL in the exemplary embodiment is further not intended to exclude any other call processing languages capable of interworking with SIP-compliant proxies.

The first element added to CPL transfers the current call information to an external trusted third-party call processing entity, which performs, for example, context-specific call processing. The second element is a mechanism to return the results, for example, of the context-specific call processing performed by the external trusted third-party call processing entity to the SIP-compliant proxy. The SIP-compliant proxy is then able to use the results to complete the call processing without processing, for example, context-specific data, such as highly confidential personal data, thus ensuring that a user's privacy is maintained and that CPL is kept simple. Highly confidential personal data can include, for example, body temperature and pulse rate.

The format of the information transmitted to the external trusted third-party call processing entity is not specifically defined herein in order to keep it as generic as possible. However, a string-based mechanism is assumed hereinafter for ease of description. It should be further noted that the SIP-compliant proxy and the external trusted third-party call processing entity are not necessarily physically separate devices so that they may be realized in a common device. That is, the SIP-compliant proxy and the external trusted third-party call processing entity are logically separate entities but might not be implemented in physically separate devices.

Using informal syntax, the following two elements are defined to effect and support the present invention:

Node: external switch
Outputs: external-result
Parameter: URL
Output: external-result
Parameter: is The "external-switch" element initiates the transfer of the current call processing information to the URL specified as a parameter. It is assumed for purposes of this description that there is a security association between the SIP-compliant proxy and the specified URL. After processing the context-specific call information by the external trusted third-party call processing entity, a string ("is" parameter) is returned to the SIP-compliant proxy to enable the SIP-compliant proxy to take appropriate follow-up call processing actions such as call redirection, call rejection, etc., based on string comparisons known in the art. The string comparisons are performed between the external-result parameter returned from the external third-party call processing entity and pre-defined strings stored in a SIP-compliant proxy.

In the context of the present invention, the third-party call processing is context-specific so the external-switch is a context-switch. Further, the results returned are context-specific so the external-result is a context-result. It should be noted that other call processing functions other than those functions that are context-specific are possible. That is, the context-specific call processing described herein is exemplary and not intended to limit the uses or types of functions that can be processed by a third-party call processing entity.

Two examples that use the above defined language extensions and third-party call processing are now described. The first example is location-based call processing and the second example is mood-based call processing. In both scenarios it is assumed that data (e.g., location categories, current location information, body temperature threshold, current body temperature, pulse rate threshold, current pulse rate, etc.) is stored in an external database, such as a database within or under the control of the third-party call processing entity.

An incoming internet call initiated at a SIP-compliant proxy when an INVITE message invokes a CPL script translated and executed by an XML interpreter. An internet call is initiated for a specific user. Within the CPL script for a specific user, the external-switch language element is detected resulting in a transfer of the call processing to a third-party call processing entity. The third-party call processing entity may be in a separate device, such as a server or may be physically in the same device as the SIP-compliant proxy but logically separated from the SIP-compliant proxy.

An example of an external-switch is a location-switch, which is a context-switch. The parameter for external-switch can be a URL, which has a conventional format and definition. The output or result can be returned in external-result, which can be a context-result. An indication that call processing is being returned to a CPL script in an SIP-compliant proxy may be returned in external-result. A string indicating an action to be taken may be returned to a CPL script in an SIP-compliant proxy in an external-result parameter.

Within the third-party call processing entity, location categories pre-defined by a specific user are stored in an external database. Depending on the pre-defined location categories different results are returned to the SIP-compliant proxy. For example, a specific user might have defined an at home location category, an at work location category, and an "out" location category, where "out" may encompass the theater, the movies, a restaurant, etc. The location-switch third-party call processing entity, using mobile network resources, would determine where the specific user is located.

If the user is at work or at home, the specific user may have pre-defined that call processes using rules defined in the CPL script. If the user is "out" the specific user may have pre-defined that the call is redirected to a voice mailbox. A third category that might be possible is for incoming emergency calls, which may be routed to the specific user wherever the specific user is located. These emergency calls may be pre-defined by the specific user as coming from, for example, doctors, or may be pre-defined by state or Federal regulations as any call coming from an emergency service provider such as fire or rescue personnel. Calls from emergency services personnel might be pre-programmed into all location-switch third-party call processing entities as an override that cannot be altered.

Thus, a location-result might be returned indicating that call processing is being returned to the CPL script in the SIP-compliant proxy. The location-result may be the result itself (e.g., the action to be taken) or may be the indication that call processing is being returned to the CPL script. The action to be taken is, for example, a string such as "redirect", "redirect to voice mailbox", "continue", "continue processing", "reject" or "override". In a preferred embodiment, the action to be taken is returned as a location-result parameter. The CPL script in the SIP-compliant proxy decodes the action to be taken and performs, in the present example, a string comparison between the action to be taken returned from an external third-party call processing entity and a set of pre-defined strings stored in an SIP-compliant proxy.

Another example of an external-switch is a mood-switch. In this scenario, sensor data such as body temperature and pulse rate may be gathered by an intelligent mobile device and stored in a database, such as an external database in the third-party call processing entity or in a database accessible to and controlled by the third-party call processing entity. This transfer to the third-party call processing entity may occur using a URL in a manner similar to the description above.

If the user shows no indication that certain pre-defined thresholds have been exceeded then the call may be processed normally ("continue" or "continue processing") as defined in the CPL script in the SIP-compliant proxy. An indication of high body temperature or high pulse rate may have been pre-defined by the specific user to "reject" certain callers or certain calling phone numbers. Still other calls may be redirected to a mailbox via a "redirect" or "redirect to voice mailbox" action to be taken mood-result parameter. Again, calls originating with emergency service providers might not be rejected depending upon state and Federal regulations, or other pre-defined conditions.

The mood-switch third-party call processing entity may query the database or gather current sensor data using the intelligent mobile device. The specific user may have pre-defined certain thresholds and the action to be taken in the event those thresholds are exceeded. The mood-result may indicate that call processing is being returned to the CPL script in the SIP-compliant proxy or may be the actual action to be taken. The action to be taken may, for example, be a string such as "redirect", "redirect to voice mailbox", "continue", "continue processing", "reject" or "override." In a preferred embodiment, the action to be taken is returned in a mood-result parameter. The CPL script in the SIP-compliant proxy decodes the action to be taken performing, in the present example, a string comparison between the action to be taken returned from an external third-party call processing entity and a set of pre-defined strings stored in a SIP-compliant proxy. Based on the results of the string comparison, a CPL script in an SIP-compliant proxy continues to process the call.

FIG. 1 illustrates the signaling communication between the SIP-compliant proxy and an external trusted third-party call processing entity. The enhancements to CPL are shown in the figure but the actual messages are not depicted.

An SIP-compliant proxy 101 first receives an INVITE message 103. A CPL script 105 is to be executed within the SIP-compliant proxy. CPL is defined in XML so an XML interpreter 107 may be used for parsing and translation of CPL language elements. Once the first new language element (external-switch) 109 is detected by XML interpreter 107, call processing is transferred to a third-party call processing entity shown in this exemplary embodiment as a logically and physically separate entity. The third-party call processing entity is specified as the URL parameter in the first new language element.

In an exemplary embodiment, third-party call processing entity 111 processes the context-specific information according to third-party call processing logic 113 and returns (external-result) 115 to XML interpreter 107 in SIP-compliant proxy 101 using the second new language element. The external-result return may include the result (action to be taken) or, alternatively, a separate external-result parameter may be defined.

The action to be taken may then be decoded by the SIP-compliant proxy. The decoding may be accomplished using a string comparison if the results (external-result and/or external-result parameter) are in string form. Alternative decoding techniques include bit testing, bit manipulation, or any other character and arithmetic decoding techniques.

The two new language elements of the present invention may be integrated in current SIP-compliant proxy implementations, specifically in the CPL parser block. Additionally, the functionality to parse the new language elements can be added to the CPL language definition in XML parsers (interpreters). Finally, transfer capabilities between the SIP-compliant proxy and a third-party call processing entity may be implemented in the SIP-compliant proxy. Because, the entire SIP call control message flow is standardized, the two new CPL language elements are easily detected.

Figure 2:
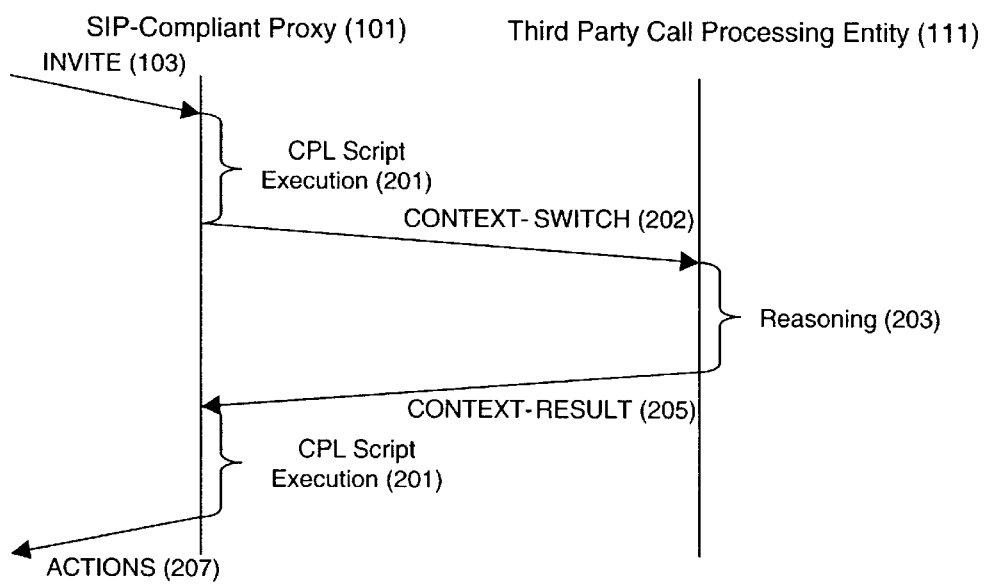
FIG. 2 shows the message flow between a SIP-compliant proxy and an external trusted third-party call processing entity.

FIG. 2 illustrates the message flow between SIP-compliant proxy 101 and external trusted third-party call processing entity 111. As indicated, upon reception of an incoming INVITE message 103 in a local SIP-compliant proxy, the appropriate CPL script, which is stored in the local SIP-compliant proxy, is executed. If during the execution 201 of the CPL script an external-switch language element is detected, the SIP-compliant proxy transfers call information and control to the third-party call processing entity 111 specified by external-switch 202, such as location-switch, mood-switch etc. as a URL. Upon reception by a third-party call processing entity appropriate logic or reasoning 203 is performed or executed based on pre-defined user preferences.

As a result of the reasoning performed by a third-party call processing entity, such as described in the examples above, the third-party call processing entity returns an external-result and/or an external result parameter 205 to the CPL script 201 in the SIP-compliant proxy. The SIP-compliant proxy decodes the information and performs, for example, a string comparison between the action to be taken returned from external third-party call processing entity 111 and a set of pre-defined strings stored in SIP-compliant proxy 101. Based on the results of the string comparison, CPL script 201 in SIP-compliant proxy 101 performs resultant action 207 (continues to process the call), which may be, for example, call rejection, call redirection, continuation of call processing.

While the modules described above have been described in terms of software, the modules may also be implemented in Application Specific Integrated Circuits (ASICs) or Field Programmable Gate Arrays (FPGAS) or any other equivalent device. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What I claim is:

1. A method for outsourcing Internet call processing functions from a session initiation protocol (SIP)-compliant proxy, comprising the steps of:

executing a call processing language script in said SIP-compliant proxy;

detecting an external-switch;

transferring call processing to a third-party call processing entity identified in an external-switch parameter;

receiving an external-result from the third-party call processing entity; and completing said call processing using information in said external-result.

2. The method according to claim 1, further comprising the steps of:

detecting an external-result parameter;

decoding said external-result parameter; and completing said call processing using information in said external-result parameter.

3. The method according to claim 2, wherein said external-result parameter comprises a string.

4. The method according to claim 3, wherein said decoding step further comprises the step of extracting said information from said string by performing a string comparison.

5. The method according to claim 1, wherein said external-switch comprises a context-switch.

6. The method according to claim 1, wherein said external-result comprises a context-result.

7. The method according to claim 1, wherein said external-switch parameter comprises a URL.

8. The method according to claim 1, wherein said third-party comprises an external trusted third-party call processing entity.

9. The method according to claim 8, wherein said call processing performed by said third-party uses highly-confidential personal data.

10. The method according to claim 1, wherein call processing performed by said third-party is context-specific.

11. A method for performing Internet call processing functions in a third-party call processing entity forwarded by a session initiation protocol (SIP)-compliant proxy, comprising the steps of:

detecting a transfer of call processing control to said third-party call processing entity;

executing requested call processing functions; and returning an external-result to said SIP-compliant proxy for completion of call processing.

12. The method according to claim 11, further comprising the step of returning an external-result parameter.

13. The method according to claim 12, wherein said external-result parameter comprises a string.

14. The method according to claim 11, wherein said transfer comprises an external-switch.

15. The method according to claim 11, wherein said third-party comprises an external trusted third-party call processing entity.

16. The method according to claim 11, wherein said call processing performed by said third-party uses highly confidential personal data.

17. A computer readable medium storing computer executable instructions that, when executed by a session initiation protocol (SIP)-compliant proxy server, perform a method for outsourcing Internet call processing functions, comprising:

executing a call processing language script in said SIP-compliant proxy;

detecting an external-switch;

transferring call processing to a third-party call processing entity identified in an external-switch parameter;

receiving an external-result; and completing said call processing based on said external-result.

18. The computer readable medium according to claim 17, wherein the method further comprises:

detecting an external-result parameter;

decoding said external-result parameter; and completing said call processing using information in said external-result parameter.

19. The computer readable medium according to claim 18, wherein said external-result parameter comprises a string.

20. The computer readable medium according to claim 19, wherein said decoding further comprises extracting said information from said string by performing a string comparison.

21. The computer readable medium according to claim 17, wherein said external-switch comprises a context-switch.

22. The computer readable medium according to claim 17, wherein said external-result comprises a context-result.

23. The computer readable medium according to claim 17, wherein said external-switch parameter comprises a URL.

24. The computer readable medium according to claim 17, wherein said third-party comprises an external trusted third-party call processing entity.

25. The computer readable medium according to claim 24, wherein said call processing performed by said third-party uses confidential personal data.

26. The computer readable medium according to claim 17, wherein call processing performed by said third-party is context-specific.

27. A session initiation protocol (SIP)-compliant proxy, comprising:

memory storing computer executable instructions that, when executed by the proxy, perform steps of:

executing a script in said SIP-compliant proxy;

upon detection of an external-switch, transferring call processing to a third-party call processing entity identified in an external-switch parameter;

receiving an external-result; and completing said call processing based on said external-result.

28. The proxy of claim 27, further comprising an interpreter to detect the external-switch.

29. The proxy of claim 28, wherein said interpreter comprises an XML interpreter.

30. The proxy of claim 27, further comprising an interpreter to decode the external-result.

31. The proxy of claim 30, wherein said interpreter further detects an external-result parameter and, based on information extracted from at least one of said external result and said external-result parameter, completes call processing based on the information.

32. The proxy of claim 27, wherein said proxy and said third-party call processing entity are logically separate and are resident in a single unit physically.

33. The proxy of claim 27, wherein said proxy and said third-party call processing entity are logically and physically separate.

* * * * *